United States Patent [19]

Ohe et al.

[11] Patent Number: 4,742,567
[45] Date of Patent: May 3, 1988

[54] AUTOMOBILE ANTENNA SYSTEM

[75] Inventors: Junzo Ohe; Hiroshi Kondo, both of Aichi, Japan

[73] Assignee: Toyota Jidosha Kabushiki Kaisha, Toyota, Japan

[21] Appl. No.: 824,264

[22] Filed: Jan. 30, 1986

[30] Foreign Application Priority Data

Feb. 1, 1985 [JP] Japan .................................. 60-18867

[51] Int. Cl.$^4$ ........................... H04B 7/00; H01Q 1/32
[52] U.S. Cl. ..................................... 455/277; 455/278;
343/703; 343/713; 343/876
[58] Field of Search ........................... 455/277-279,
455/345, 52, 65, 133-135, 206, 297; 343/893,
703, 713, 876; 340/905

[56] References Cited

U.S. PATENT DOCUMENTS

| 4,079,322 | 3/1978 | Lawrence et al. | 340/905 |
| 4,167,738 | 9/1979 | Kirkencall | 343/703 |
| 4,499,606 | 2/1985 | Rambo | 455/277 |
| 4,566,133 | 1/1986 | Rambo | 455/277 |
| 4,633,519 | 12/1986 | Gatoh et al. | 455/277 |

Primary Examiner—Robert L. Griffin
Assistant Examiner—Curtis Kuntz
Attorney, Agent, or Firm—Cushman, Darby & Cushman

[57] ABSTRACT

An automobile antenna system composed of two antennas are attached to the rear windshield of a vehicle body. A high-frequency pickup is provided on the front pillar of the vehicle body for detecting the lowering of the output level of the main antenna in advance, and an antenna selecting signal generator actuates a switch circuit so that the main antenna, the output level of which is predicted to dip after a predetermined lapse of time, is changed over to the sub antenna, in which no dipping is occurring, whereby the output level of the diversity-reception antenna is maintained at a predetermined value or higher even when the vehicle drives into an area where stationary waves are being produced.

7 Claims, 9 Drawing Sheets

AUTOMOBILE ANTENNA SYSTEM

BACKGROUND OF THE INVENTION

1. Field of the Invention

The present invention relates to an automobile antenna system, and more particularly, to an improved automobile antenna system which prevents deflection of the output level of a main antenna provided on the rear portion of an automobile.

2. Description of the Prior Art

Generally, it is difficult to receive stable broadcast waves by means of an antenna during the travel of a vehicle. Especially, high-frequency waves in a VHF band such as FM broadcast waves have a strong tendency to experience rectilinear propagation, so that direct waves and other waves involving reflection from buildings, mountains or other obstacles interfere with each other and cause multipath phenomenon such as distortion or momentary interruption of sound.

To solve this problem, a diversity-reception type antenna system has been proposed, in which two antennas are disposed on the vehicle body at predetermined intervals so that the receiving operation is taken over by the antenna which enjoys superior reception by automatic change-over, whereby the directivity of the antenna is improved and the amount of multipath noise is lowered.

Some diversity-reception type automobile antenna systems are composed of two glass antennas provided on the upper portion and the lower portion of the rear windshield, which serves as the main antenna and the sub antenna, respectively, of a diversity-reception antenna.

Figure 9:
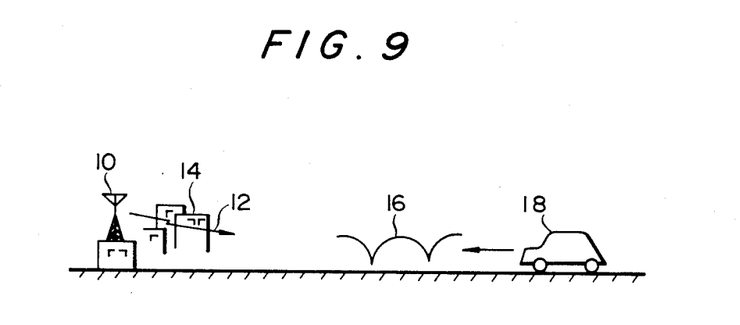
FIG. 9 is an explanatory view of stationary waves which are produced by reflection of electric waves.

However, broadcast electric waves 12 which are transmitted from a broadcasting station 10 produce stationary waves 16 at certain places when reflected by a building or the like, as shown in FIG. 9. If a vehicle which is receiving the electric waves 12 drives into the area where the stationary waves 16 are being produced and the main antenna of the vehicle is situated at the node of the stationary wave 16, the output of the main antenna suddenly drops and the receiving quality is deteriorated. It is sometimes impossible at such times to appropriately change the main antenna over to the sub antenna for improving the receiving state under a conventional diversity-reception system which employs two antennas provided on the rear windshield.

SUMMARY OF THE INVENTION

Accordingly, it is an object of the present invention to eliminate the above-described defect in the prior art and to provide an automobile antenna system which enables an appropriate switch-over between the main antenna and the sub antenna even when the vehicle is in a place where stationary waves are being produced, thereby ensuring a constantly stable receiving state.

To achieve this aim, the present invention provides an automobile antenna system composed of two antennas attached to the rear windshield of a vehicle body, a high-frequency pickup provided on the front pillar of the vehicle body for detecting the lowering of the output level of the main antenna in advance, and an antenna selecting signal generator which actuates a switch circuit so that the main antenna, the output level of which is predicted to dip after a predetermined lapse of time, is changed over to the sub antenna, in which no dipping is occurring, whereby the output level of the diversity-reception antenna is maintained at a predetermined value or higher even when the vehicle drives into an area where stationary waves are being produced.

The above and other objects, features and advantages of the present invention will become clear from the following description of the preferred embodiments thereof, taken in conjunction with the accompanying drawings.

DESCRIPTION OF THE PREFERRED EMBODIMENTS

Hereinunder, preferred embodiments of the present invention will be described with reference to the accompanying drawings. A high-frequency pickup which constitutes the antenna system according to the present invention will be described.

FIGS. 10 to 15 illustrate a process of examining the distribution characteristics of high-frequency currents so as to ascertain the location at which an antenna system can operate most efficiently on the vehicle body of an automobile.

Figure 10:
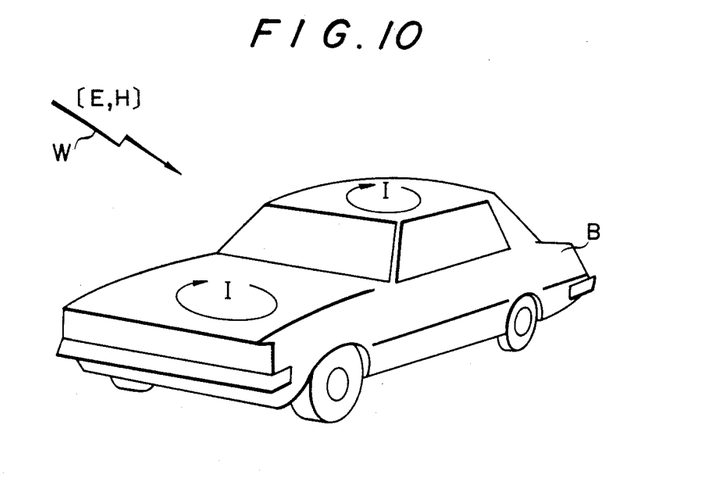
FIG. 10 illustrates surface currents I induced on the vehicle body B by external waves W.

FIG. 10 shows that, when external electric waves W such as broadcast waves pass through a vehicle body B of conductive metal, surface currents I are induced at various vehicle locations at levels corresponding to the intensities of the electromagnetic waves passing therethorugh. The present invention aims at only electromagnetic waves of relatively high frequency bands in excess of 50 MHz, such as FM broadcast waves, television waves and the like.

The present invention is characterized in that the distribution of the surface currents induced on the vehicle body by electromagnetic waves within the above-described particular wave bands is measured so as to seek a location on the vehicle body which is higher in surface current density and lower in noise and at which a pickup used in the present invention is to be located. The distribution of surface currents is determined by a simulation using a computer and also by measuring actual intensities of surface currents at various locations of a vehicle body. The measurement is carried out by the use of a probe which can operate in accordance with the same principle as that of a later-described high-frequency pickup located on the vehicle body at a desired position. Such a probe is moved in the vehicle body throughout the entire surface thereof while varying the direction of the probe at each position.

Figure 11:
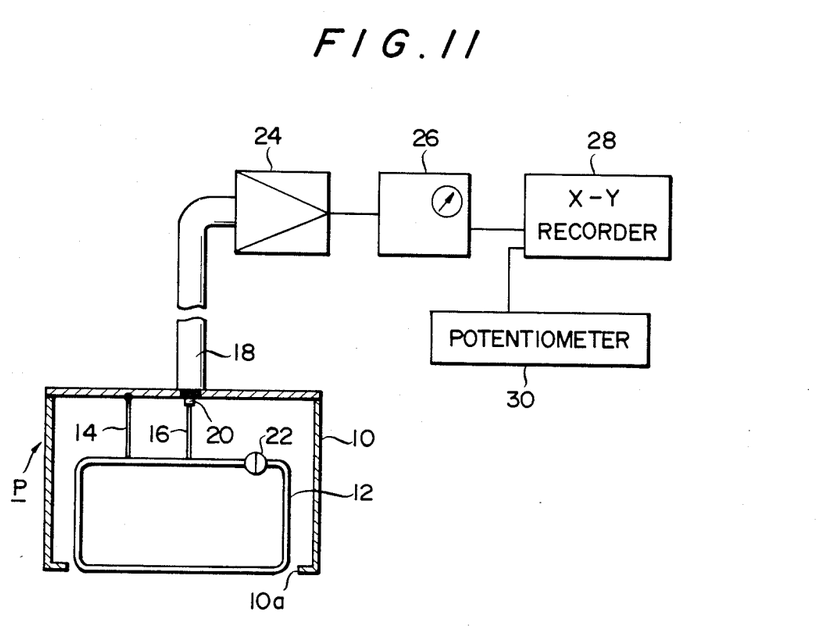
FIG. 11 illustrates a probe for detecting the distribution of surface currents on the vehicle body and having the same construction as that of the high-frequency pickup used in the present invention, and a circuit for processing signals from the probe.

FIG. 11 is a schematic view of the structure of such a probe P which is constructed in accordance with substantially the same principle as that of the high-frequency pickup described hereinafter. The probe P is composed of a casing 10 of electrically conductive material for preventing any external electromagnetic wave from transmitting to the interior thereof and a loop coil 12 fixed within the casing 10. The casing 10 includes an opening 10a formed therein through which a portion of the loop coil 12 is externally exposed. The exposed portion of the loop coil 12 is positioned in close proximity to the surface of the vehicle body B to detect the magnetic flux induced by surface currents on the vehicle body B. Another portion of the loop coil 12 is connected to the casing 10 through a short-circuiting line 14. The loop coil 12 further includes an output end 16 connected to a core 20 in a coaxial cable 18. Still another portion of the loop coil 12 includes a capacitor 22 for causing the frequency in the loop coil 12 to resonate relative to the desired frequency to be measured to increase the efficiency of the pickup.

Thus, when the probe P is moved along the surface of the vehicle body B and also angularly rotated at various locations of measurement, the distribution and direction of surface currents can accurately be determined at each of the vehicle locations. In FIG. 11, the output of the probe P is amplified by a high-frequency voltage amplifier 24 and the resulting output voltage is measured by a high-frequency voltmeter 26. This coil output voltage is read at the indicated value of the high-frequency voltmeter 26 and also is recorded by an XY recorder 28 to provide the distribution of surface currents at various vehicle locations. The input of the XY recorder 28 receives signals indicative of various vehicle locations from a potentiometer 30 to recognize the value of high-frequency surface currents at the corresponding vehicle location.

Figure 12:
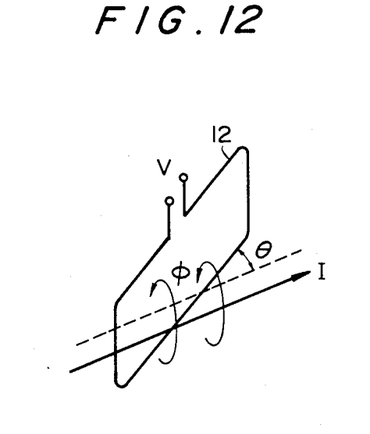
FIG. 12 illustrates the electromagnetic coupling between the surface currents I and the pickup loop antenna.
Figure 13:
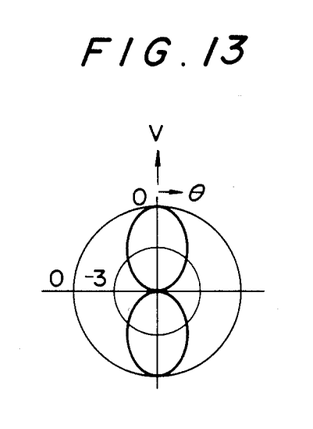
FIG. 13 illustrates the directivity of the loop antenna shown in FIG. 12.

FIG. 12 illustrates an angle θ of deflection between the high-frequency surface currents I and the loop coil 12 of the pickup. As is clear from the drawing, magnetic flux φ intersects the loop coil 12 to generate a detection voltage V in the loop coil 12. As shown in FIG. 13, when the angle of deflection is equal to zero, that is, the surface currents I are parallel to the loop coil 12 of the pickup, the maximum voltage can be obtained. The direction of the surface currents I when the probe P is rotated to obtain the maximum voltage can also be known.

Figure 14:
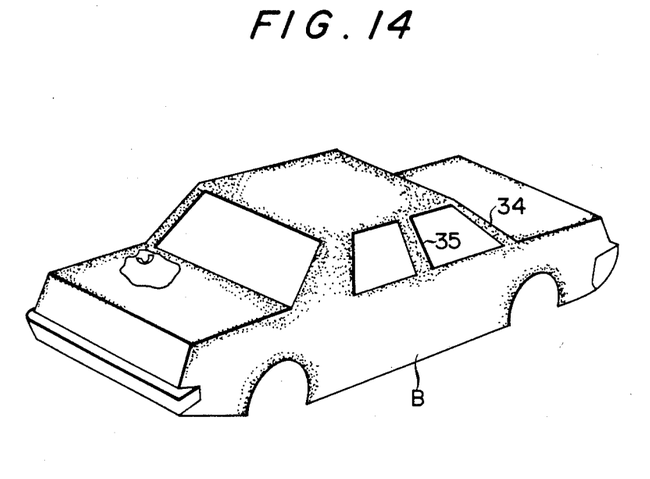
FIG. 14 illustrates the intensity distribution of the surface currents.
Figure 15:
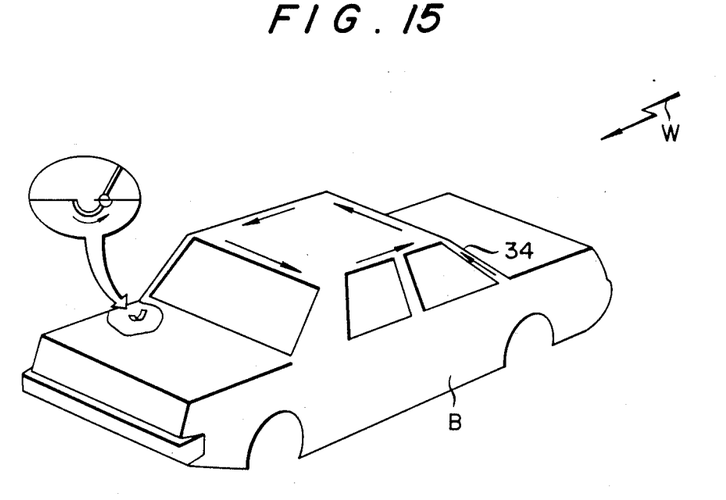
FIG. 15 illustrates the directions of flow of the surface currents.

FIGS. 14 and 15 respectively show the magnitude and direction of high-frequency surface currents induced at various different locations of the vehicle body at the frequency of 80 MHz, the values of which are obtained from the measurements of the probe P and the simulation effected by the computer. As can be seen from FIG. 14, the distribution of surface currents has higher densities at the marginal portions of the vehicle body and lower densities at the central portions of the flat vehicle panels.

It will also be apparent from FIG. 15 that the surface currents are concentrated in the direction parallel to the marginal edges of the vehicle body or in the direction along the connections of various flat panels.

This distribution of surface currents also shows that the surface currents are concentrated not only on the external surface of the vehicle body B but also on the front pillar at a high density. In this embodiment, attention is paid particularly to the front pillar, and a high-frequency pickup 34 is provided on a front pillar 32 of the vehicle body for detecting high-frequency surface currents of broadcast waves which flow through various locations.

As described above, and as shown in FIG. 1 a main antenna 40 and a sub antenna 42 for effecting diversity reception are attached to a rear windshield 38 of a vehicle body 36 and the high-frequency pick up 34 is provided for the purpose of detecting, prior to reception by the antennas, deflection of the output of the main antenna which occurs when the vehicle travels through an area where stationary waves of the broadcast electric waves are being produced. A later-described circuit predicts the fact that the level of the main antenna 40 will dip after a predetermined lapse of time and changes the main antenna over to the sub antenna, in which no dip is being produced, whereby the output level of the antenna is maintained at a certain level or higher.

The structure of the high-frequency pickup 34 provided on the front pillar 32 will here be explained with reference to FIGS. 2 to 4.

Figure 2:
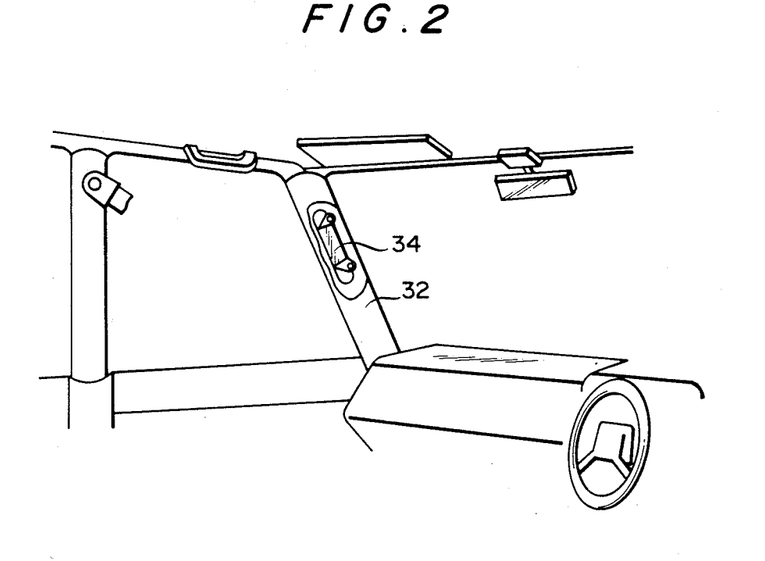
FIG. 2 is an explanatory view of the substantial position of a front pillar at which a high-frequency pickup is attached.
Figure 3:
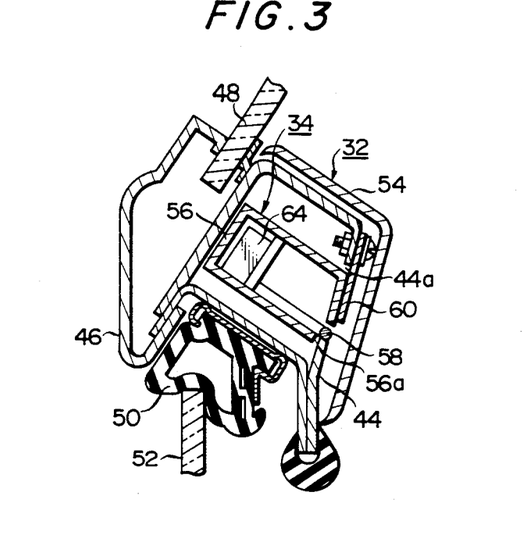
FIG. 3 is a cross sectional view of the front pillar shown in FIG. 2, on which an electromagnetic coupling type high-frequency pickup is mounted.
Figure 4:
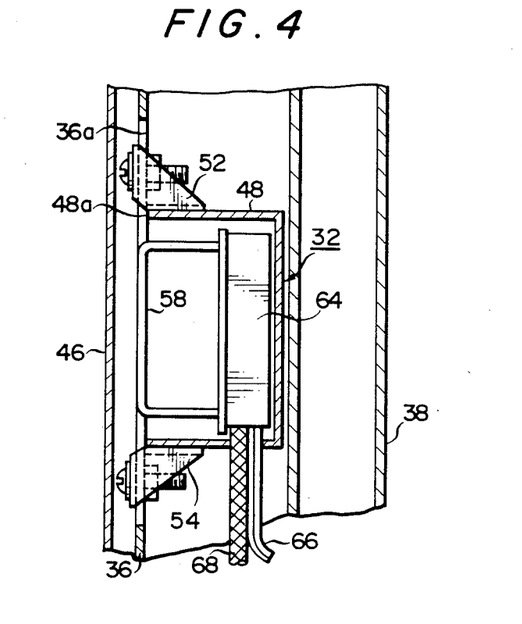
FIG. 4 is a vertical sectional view of the front pillar shown in FIG. 3.

As is clear from the cross sectional view in FIGS. 2-4, the high-frequency pickup 34 includes a pillar 32 and a pedestal plate 44 which is formed on a hollow prism serving as the main pillar thereof. A windshield molding 46 is secured to the side surface of the pedestal plate 44 which faces the exterior of the vehicle body, and the windshield glass 48 is retained by the molding 46.

A weather strip rubber 50 is secured to the surface of the pedestal plate 44 which faces the rear portion of the vehicle body, thereby maintaining the sealed state of the joint between a side window glass and the pedestal plate 44.

Furthermore, a front pillar garnish 54 is mounted on the surface of the pedestal plate 44 which faces the interior of the vehicle body, so as to maintain the aesthetically pleasing appearance by enclosing the surface of the pedestal plate 44.

In this embodiment, the high-frequency pickup 34 of an electromagnetic coupling type is disposed in the longitudinal direction of the front pillar 34 in such a manner that the pickup 34 is inserted into the hollow portion of the pedestal plate 44.

The high-frequency pickup 34 is composed of a casing 56 of a conductive material and a loop antenna 58 provided therewithin, as is obvious from FIGS. 3 and 4. The casing 56 for shielding the loop antenna from an external electromagnetic field is provided with an opening 56a at one side thereof. The loop antenna 58 is exposed from the opening 56a and is disposed in proximity to the pillar, in particular, to the pedestal plate 44, where high-frequency surface currents concentratedly flow.

An opening 44a is provided at a part of the pedestal plate 44 in this embodiment, in order that the high-frequency pickup 34 is inserted into the hollow pillar through the opening 44a before the front pillar garnish 54 is secured.

In order to secure the casing 56 of the high-frequency pickup 34 to the pedestal plate 44, brackets 60, 62 are fixed to both sides of the casing 56 by spot welding or the like, and the brackets 60, 62 are tightly screwed to the pedestal plate 44, as shown in FIG. 4.

Accordingly, the loop antenna 58 in this fixed state is so disposed as to be opposed and in proximity to the opening 44a of the pedestal plate 44, and the magnetic flux induced by the high-frequency surface currents which are concentrated and flowing on the pedestal plate 44 effectively intersect the loop antenna 58.

A circuitry 64 including a pre-amplifier and the like is housed behind the loop antenna 58 in the casing 56. Power source and a signal for controlling the circuit is supplied from a cable 66 to the circuitry 64, and the high-frequency detection signal fetched by the loop antenna 58 is fetched outward from a coaxial cable 68 and is processed by a circuit similar to that used for examining distribution of surface currents.

The loop antenna 58 is in the form of a single wound coil which is covered with an insulation such that the coil can be arranged in an electrically insulated relationship with and in close contact with the pillar pedestal plate 44. Thus, the magnetic flux induced by the surface currents concentratedly flowing on the pedestal plate 44 can intersect the loop antenna 58 with good efficiency.

After the high-frequency pickup 34 is inserted into the front pillar 32 in this way, the front pillar 32 is covered with the front pillar garnish 54. Thus the structure of the front pillar 32 is perfectly the same as an ordinary pillar in terms of external appearance.

When stationary waves are produced by electric waves transmitted from a broadcasting station due to reflection from buildings or the like, the interval of the dips in the stationary waves is proportional to $\lambda/2|\cos\alpha|$, which represents the angle between the direction in which the vehicle is travelling and the direction in which the electric waves from the broadcasting station are being transmitted. Accordingly, the distances between the high-frequency pickup 34, the main antenna 40 and the sub antenna 42 are set to be $\lambda/2$ or less, which is the shortest possible interval between the dips.

Figure 1:
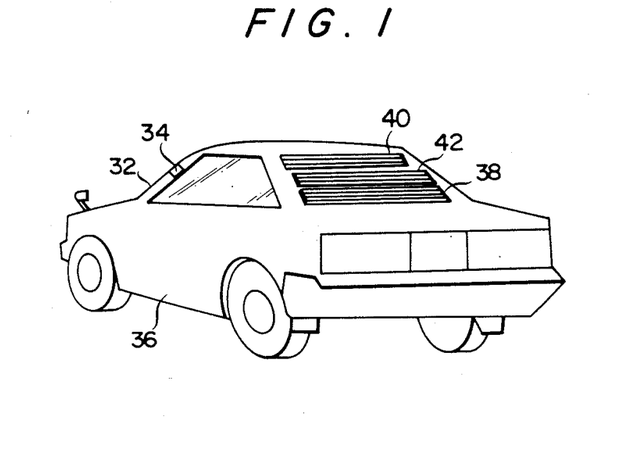
FIG. 1 is a schematic view of the positions at which an automobile antenna system according to the present invention is attached.
Figure 5:
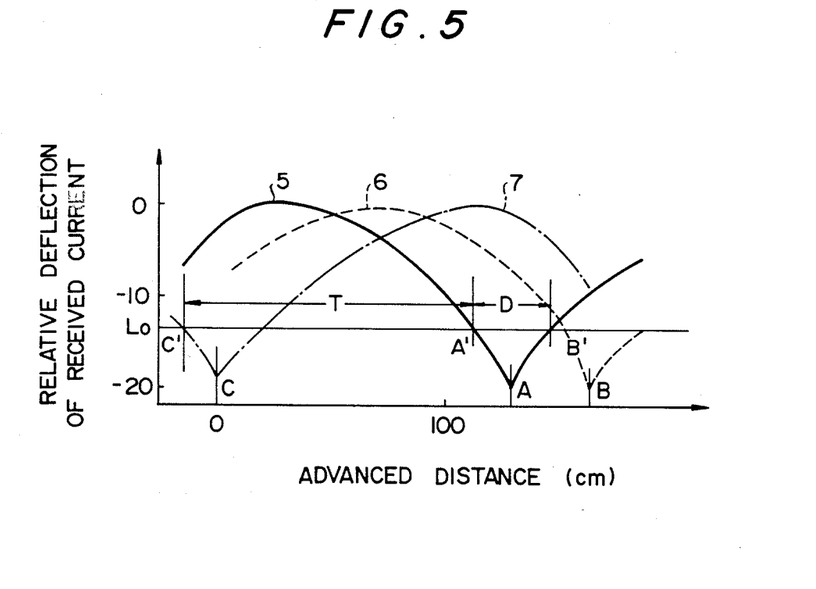
FIG. 5 illustrates the output levels of a high-frequency pickup, a main antenna and a sub antenna.

When a vehicle provided with the high-frequency pickup 34, the main antenna 40 and the sub antenna 42, as shown in FIG. 1, drives into an area where stationary waves are being produced at a predetermined speed, the respective outputs of the high-frequency pickup 34, the main antenna 40 and the sub antenna 42 dip at different points depending on the distance travelled, as shown in FIG. 5. The points at which the outputs 34a, 40a, and 42a, of the high-frequency pickup 34, the main antenna 40 and the sub antenna 42, respectively, dip to their lowest level are here represented as C, A and B, respectively. The distance between each of these points, namely, the respective distances between C and A, A and B, and B and C, is equal to the distances between the positions of the high-frequency pickup 34 and the main antenna 40, the main antenna 40 and the sub antenna 42, and the sub antenna 42 and the high-frequency pickup 34, respectively.

In FIG. 5, if the points at which the outputs dip below the output level $L_0$ of the antenna of a cassette radio at which the S/N ratio is lowered and noise is produced are expressed by C', A' and B', the period T between the time when the output level of the high-frequency pickup 34 falls below the level $L_0$ at the point C' and the time when the output level of the main antenna 40 falls below the level $L_0$ at the point A' is expressed by the following formula:

$$T = L_{24} \times 1/\text{vehicle speed} \qquad (1)$$

wherein $L_{24}$ represents the distance between the two antennas.

The period D during which the output of the main antenna is below the output level $L_0$ is proportional to $L_0$ and 1/ vehicle speed.

The antenna system according to the present invention is characterized in that the high-frequency pickup 34 detects the deflection of the output of the antenna prior to reception by the main antenna 40 and the sub antenna 42, that the level of the main antenna 40 is predicted to dip after lapse of the predetermined time T, and that the main antenna 40 is changed over to the sub antenna 42 which is free from any dip in output for the period D during which the main antenna 40 suffers from the lowering of output, whereby the output level of the antenna system is at all times maintained at a certain level or higher.

Figure 6:
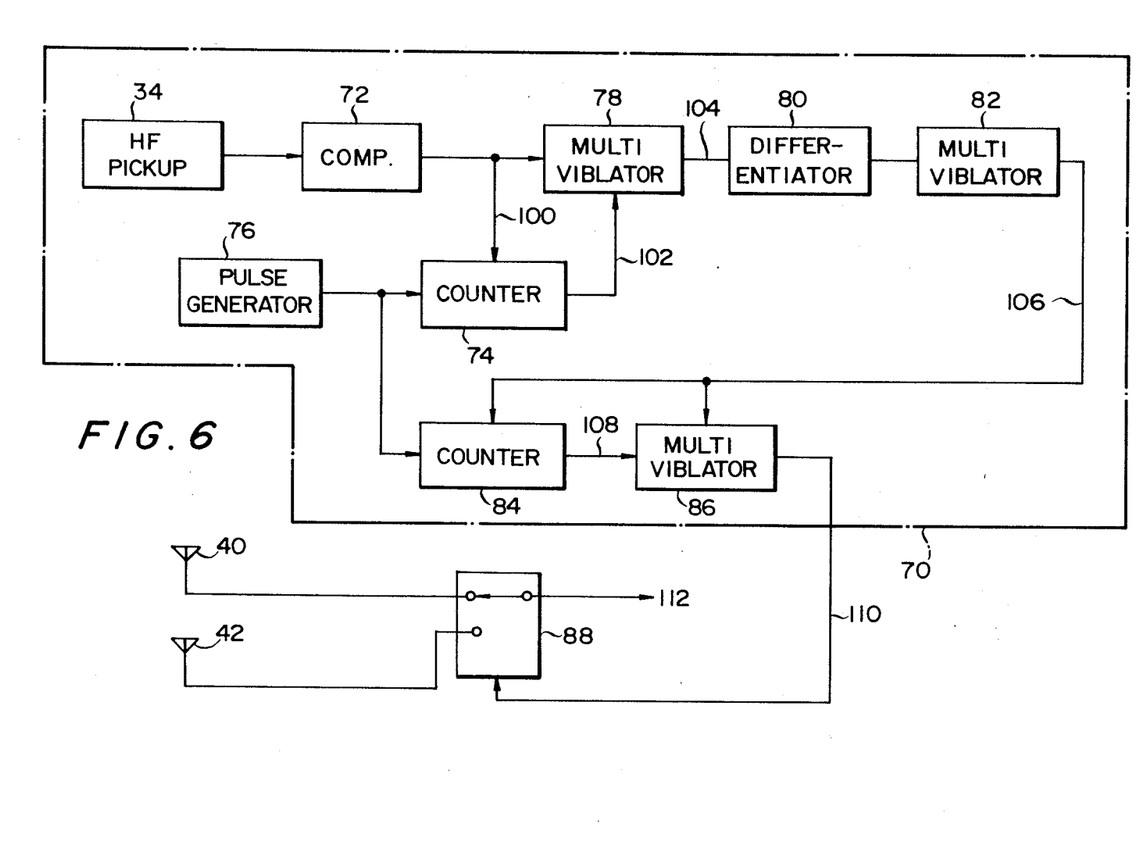
FIG. 6 is a circuit diagram of an automobile antenna system.
Figure 7:
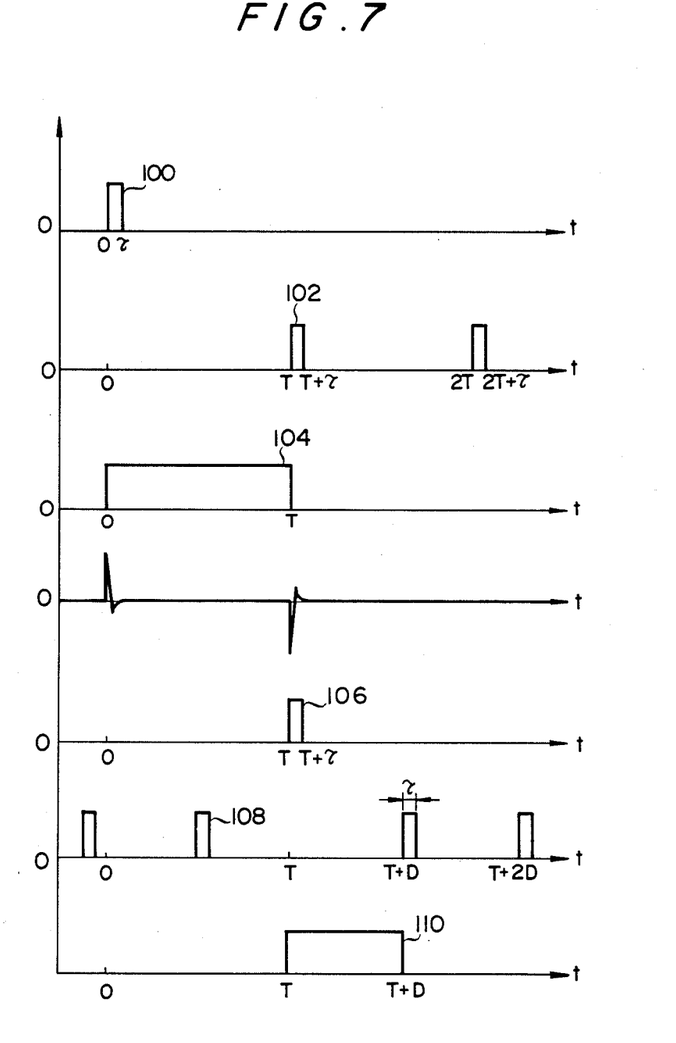
FIG. 7 illustrates the wave form of each of the pulses generated in the circuit shown in FIG. 6.

An antenna selection signal generator 70 which actuates a switch circuit so that when the high-frequency pickup 34 detects deflection of the output of the main antenna 40, the output level of which is predicted to dip the output level after lapse of the predetermined time, is changed over to the sub antenna 42, in which no dipping in output is occurring, will now be explained with reference to FIGS. 6 and 7.

The output of the high-frequency pickup 34 is input to a level comparator 72. The comparator 72 outputs a mono pulse 100 and after a pulse counter 74 is reset by the pulse 100, a pulse 102 is generated every time the counter 74 counts the pulses generated by a vehicle speed pulse generator 76 up to the number of pulses which corresponds to the period T. A bistable multi vibrator 78 generates a signal 104 from the pulse 100, which is an ON signal, and the pulse 102, which is an OFF signal.

After the signal 104 passes through a differentiator 80, a monostable multi vibrator 82 which is driven by a negative voltage produces a signal 106 which causes a pulse to be generated once the period T has elapsed. The signal 106 resets a pulse counter 84 which generates a pulse every time it counts up to the number of pulses which corresponds to the period D. Thereafter signals 108 and 106 become an OFF signal and ON signal, respectively, with respect to a bistable multi vibrator 86, which produces an signal 110 serving as an ON signal for a period T to T+D.

A switch circuit 88 changes the main antenna 40 over to the sub antenna 42 for a period T to T+D in accordance with the signal 110 produced by the antenna selecting signal generator 70, and after this period has elapsed, changes the sub antenna 42 to the main antenna 40. The output 112 of the main antenna 40 or the sub antenna 42 is transmitted to the radio receiver.

Another embodiment will be described with reference to FIG. 8. This embodiment enables broadcast waves to be received by the antenna which is superior in receiving quality while the vehicle is being reversed or parked.

Figure 8:
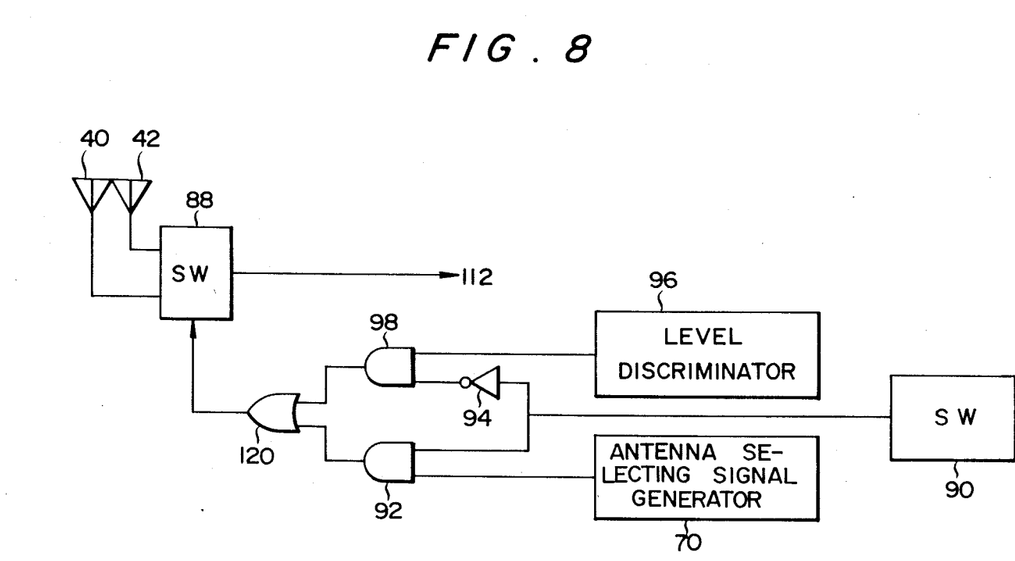
FIG. 8 is an explanatory view of another embodiment of the present invention.

In FIG. 8, the output of a switch 90 which produces an output when a transmission is set in the parking range or the reverse range is divided into two. One is connected to the antenna selecting signal generator 70 and an AND gate 92, and the other is connected to an inverter 94. The output of the inverter 94 and the output of a level discriminator 96 which outputs a signal when the output of an intermediate frequency amplifier of the receiver is below a predetermined value are connected to an AND gate 98. Each output side of the two AND gates 92, 98 is connected to the switch circuit 88 through an OR circuit 120.

As described above, according to the present invention, any degeneration of the S/N ratio is prevented by the operation described in the first embodiment during travel of a vehicle. The degeneration of the S/N ratio is also prevented at the time of parking and reversing by having the receiving operation taken over by the antenna which is enjoying the superior receiving quality of the two antennas 40, 42 at the relevant time by automatic change-over.

Thus, the antenna system according to the present invention enables the antenna having superior quality to be selected constantly, thereby exhibiting stable receiving sensitivity even in areas where broadcast waves are producing stationary waves due to reflection from buildings or the like.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An automobile antenna system comprising:
   a main antenna provided on a rear portion of a vehicle body;
   a sub antenna provided to the rear of said main antenna;
   high-frequency pickup means for detecting magnetic flux induced by surface currents on the vehicle body resulting from broadcast waves passing though the vehicle body, said high-frequency pickup means outputting a signal proportional in strength to the magnetic flux detected, said high-frequency pickup means being electrically coupled to said main and sub antennas and being provided on a forward portion of the vehicle body for detecting deflection of an output of said main antenna in advance; and
   antenna selecting signal generator means for actuating a switch circuit to select between said main and sub antennas outputs and for selecting said sub antenna output when an output level of said main antenna is predicted to dip after a predetermined lapse of time T by said high-frequency pickup means output signal dropping below a threshold limit, said sub antenna output being selected for a period D during which the dip in the output level of said main antenna occurs.

2. An automobile antenna system according to claim 1, wherein said high-frequency pickup means is provided in parallel to a marginal edge portion of said vehicle body or along an edge of a flat vehicle panel.

3. An automobile antenna system according to claim 2, wherein said high-frequency pickup means is provided along a front pillar of a vehicle body.

4. An automobile antenna system according to claim 1, wherein said main antenna and sub antenna are provided on the rear windshield of said vehicle body.

5. An automobile antenna system according to claim 1, wherein said antenna selecting signal generator means calculates said time T from the following formula:

$$T = L_{24} \times 1/\text{vehicle speed}$$

wherein $L_{24}$ represents the distance between the position to which said high-frequency pickup means attached and the position to which said main antenna is attached, and the output level of said main antenna is predicted to dip after said time T has elapsed from the time when said high-frequency pickup means detects in advance deflection of the output of said main antenna.

6. An automobile antenna system according to claim 1, wherein said antenna selecting signal generator means includes:
   a level comparator which outputs a mono pulse signal when the output of said high-frequency pickup means falls below the standard level $L_0$;
   a first pulse counter which is reset by said mono pulse signal and outputs a pulse signal every time said first pulse counter counts a count pulse generated by a vehicle speed pulse generator up to the number of pulses which corresponds to said time T;
   a first bistable multi vibrator which outputs a predetermined signal using the pulses produced by said level comparator and said first pulse counter as an ON signal and an OFF signal, respectively;
   a monostable multi vibrator which is driven by a negative voltage of the output signal from a differentiator which differentiates the output signal of said bistable multi vibrator;
   a second pulse counter which is reset by the output of said monostable multi vibrator and outputs a predetermined pulse signal every time said second pulse counter counts a count pulse generated by said vehicle speed pulse generator up to the number thereof which corresponds to said time D; and
   a second bistable multi vibrator which outputs a sub antenna selecting signal for a period T to T+D, using the outputs from said second pulse counter and said monostable multi vibrator as an ON signal and an OFF signal, respectively.

7. An automobile antenna system according to claim 1, further comprising:
   a switch for outputting a predetermined drive signal when a transmission is set in the parking range or the reverse range;
   a first AND gate to which the outputs of said antenna selecting signal generator means and said switch are input;
   a second AND gate to which the output of said antenna selecting signal generator means is input through an inverter and the output of a level discriminator which is produced when the output signal of an intermediate frequency amplifier of a receiver is below a predetermined value; and
   an OR circuit which calculates the outputs of said first and second AND gates on the basis of OR operation and outputs the calculated value as a selecting signal of said switch circuit;
   thereby enabling broadcast waves to be received from the main or sub antenna which is superior in receiving quality while said vehicle is being reversed or parked.

* * * * *